(12) United States Patent
Aull et al.

(10) Patent No.: US 8,426,797 B2
(45) Date of Patent: Apr. 23, 2013

(54) CMOS READOUT ARCHITECTURE AND METHOD FOR PHOTON-COUNTING ARRAYS

(75) Inventors: Brian F. Aull, Cambridge, MA (US);
Matthew J. Renzi, Arlington, MA (US);
Robert K. Reich, Tyngsboro, MA (US);
Daniel R. Schuette, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 445 days.

(21) Appl. No.: 12/730,048

(22) Filed: Mar. 23, 2010

(65) Prior Publication Data

US 2011/0235771 A1 Sep. 29, 2011

(51) Int. Cl.
*H03K 21/40* (2006.01)

(52) U.S. Cl.
USPC .............................. 250/214 R; 377/19; 377/51

(58) Field of Classification Search .............. 250/214 R; 377/19, 51
See application file for complete search history.

(56) References Cited

U.S. PATENT DOCUMENTS

| 2005/0012033 | A1 | 1/2005 | Stern et al. |
| 2006/0131484 | A1 | 6/2006 | Peting |
| 2007/0182949 | A1* | 8/2007 | Niclass ............................ 356/3 |

FOREIGN PATENT DOCUMENTS

| FR | 2936118 | 3/2010 |
| WO | WO-2004/054235 | 6/2004 |
| WO | WO-2004/099865 | 11/2004 |

OTHER PUBLICATIONS

International Search Report of PCT/US2011/026843 dated Jul. 28, 2011.
Aull, Brian F., et al., "Geiger-Mode Avalanche Photodiodes for Three-Dimensional Imaging," *Lincoln Laboratory Journal*, 13(2): 335-350 (2002).

* cited by examiner

*Primary Examiner* — Tony Ko
(74) *Attorney, Agent, or Firm* — Foley & Lardner LLP

(57) ABSTRACT

Embodiments of the present invention include complementary metal-oxide-semiconductor (CMOS) readout architectures for photon-counting arrays with a photon-counting detector, a digital counter, and an overflow bit in each of the sensing elements in the array. Typically, the photon-counting detector is a Geiger-mode avalanche photodiode (APD) that emits brief pulses every time it detects a photon. The pulse increments the digital counters, which, in turn, sets the overflow bit once it reaches a given count. A rolling readout system operably coupled to each sensing element polls the overflow bit, and, if the overflow bit is high, initiates a data transfer from the overflow bit to a frame store. Compared to other photo-counting imagers, photon-counting imagers with counters and overflow bits operate with decreased transfer bandwidth, high dynamic range, and fine spatial resolution.

35 Claims, 5 Drawing Sheets

CMOS READOUT ARCHITECTURE AND METHOD FOR PHOTON-COUNTING ARRAYS

GOVERNMENT SUPPORT

The invention was supported, in whole or in part, by Contract Nos. F19628-00-C-0002 and FA8721-05-C-0002 awarded by the U.S. Air Force. The Government has certain rights in the invention.

BACKGROUND OF THE INVENTION

Two-dimensional arrays of photon-counting sensing elements can be used for imaging in extremely dim (low-light) environments. Photon-counting imagers are important for many defense applications, including night vision, remote surveillance, adaptive optics and biodetection. Photon-counting imagers can also be used to determine approximately when a given photon or group of photons arrives, which is important for correlating image data, removing jitter, and compensating for predictable motion in data from or relating to micro air vehicles, satellites, and bio-fluorescence.

Photon-counting sensing elements include avalanche photodiodes (APDs), which can be biased above breakdown to operate in Geiger mode. When an APD operating in Geiger mode detects a single photon, the APD generates a pulse at a level sufficient to trigger a complementary metal oxide semiconductor (CMOS) circuit, enabling direct photon-to-digital conversion to occur in the sensing element itself. Because photon-counting imagers collect data directly in digital form, they do not suffer from readout noise or require analog-to-digital conversion, as do other solid-state sensors.

Although photon-counting imagers offer many advantages over other solid-state sensors, it can be difficult to transfer the large amounts of digital data generated by photon-counting imagers quickly enough to read out the imager. For example, suppose that the desired photon flux is one photon per ten nanoseconds, i.e., a given photon is known to arrive within a ten-nanosecond window. To read out each photon, each sensing element must be interrogated once every ten nanoseconds, which can be prohibitively fast for large numbers of sensing elements (e.g., an array with one-thousand elements requires a readout rate of 100 Gb/s). Each sensing element must transfer a bit once between successive photon detections to avoid data loss.

One approach to reducing the transfer bandwidth is to incorporate a digital counter in each sensing element. With an n-bit counter, up to $2^n-1$ detections can be counted by the sensing element before it must be read out. Such an architecture, while straightforward, imposes a tradeoff between the dynamic range (as limited by counter overflow) and the size of the sensing element. A counter with many bits can count a large number of detected photons, but also occupies a lot of real estate, limiting the minimum size of the pixel, and, thus, the spatial resolution of the intensity imager. In addition, every bit from the counter must be transferred during each readout to avoid loss of information, so the transfer bandwidth increases with the number of bits.

Thus, a need exists for a photon-counting imager with low transfer bandwidths, relatively small sensing elements, and high dynamic range.

SUMMARY OF THE INVENTION

Embodiments of the present invention include an apparatus and method for detecting and counting photons. Example photon-counting imagers and complementary metal-oxide-semiconductor (CMOS) readout architectures for photon-counting imagers according to embodiments of the present invention include an array of sensing elements, each of which includes a photon-counting detector, such as an avalanche photodiode (APD) operating in Geiger mode, a digital counter, and an overflow bit. The counter is operably coupled to and responds to signals from the photon-counting detector, and the overflow bit is operably coupled to and responsive to the digital counter. Example imagers and CMOS readout architectures according to embodiments of the present invention also include a rolling readout system operably coupled to each sensing element and configured to poll the overflow bit in each sensing element, and a frame store coupled to the array of sensing elements and configured to store data from the overflow bits and the counters.

Example methods of detecting and counting photons may start with detecting photons at a particular sensing element in an array of sensing elements. Next, a digital counter in the particular sensing element is incremented in response to detection of each photon by the sensing element. When the digital counter indicates that a given number of photons has been detected and counted, an overflow bit in the particular sensing element is set. Polling the overflow bit yields an indication that the given number of photons has been detected and counted. If the overflow bit is high, it may be transferred to a frame store.

Further embodiments include examples of the sensing element itself. As above, example sensing elements include a photon-counting detector, such as an APD, a digital counter, and an overflow bit. The counter is operably coupled to and responds to signals from the photon-counting detector, and the overflow bit is operably coupled to and responsive to the digital counter.

Compared to CMOS readout architectures with one-bit sensing elements, CMOS architectures with counters and overflow bits have lower transfer bandwidths, higher dynamic ranges, and dissipate less power. In addition, the reduction in counter length afforded by the overflow bits results in a reduction in the size of the individual sensing elements. As a result, sensing elements with counters and overflow bits can be used to make imagers with better spatial resolution than imagers comprising sensing elements with full-length counters. Thus, readout architectures with counters and overflow bits combine high dynamic range with high spatial resolution, low bandwidth, and low power dissipation, which are imager performance parameters that tend to be mutually incompatible.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Photon-counting imagers with counters and an overflow bit in each sensing element can be used for medical and defense applications; quantum computing; cryptography and information technology; scientific imaging; and imaging for the scientific and consumer markets. For example, photon-counting imagers can be used for imaging laser radar, as described in B. F. Aull et al., "Geiger-mode Avalanche Photodiodes for Three-Dimensional Imaging," Lincoln Laboratory Journal 13(2): 335-349, 2002, incorporated herein by reference in its entirety.

Figure 1:
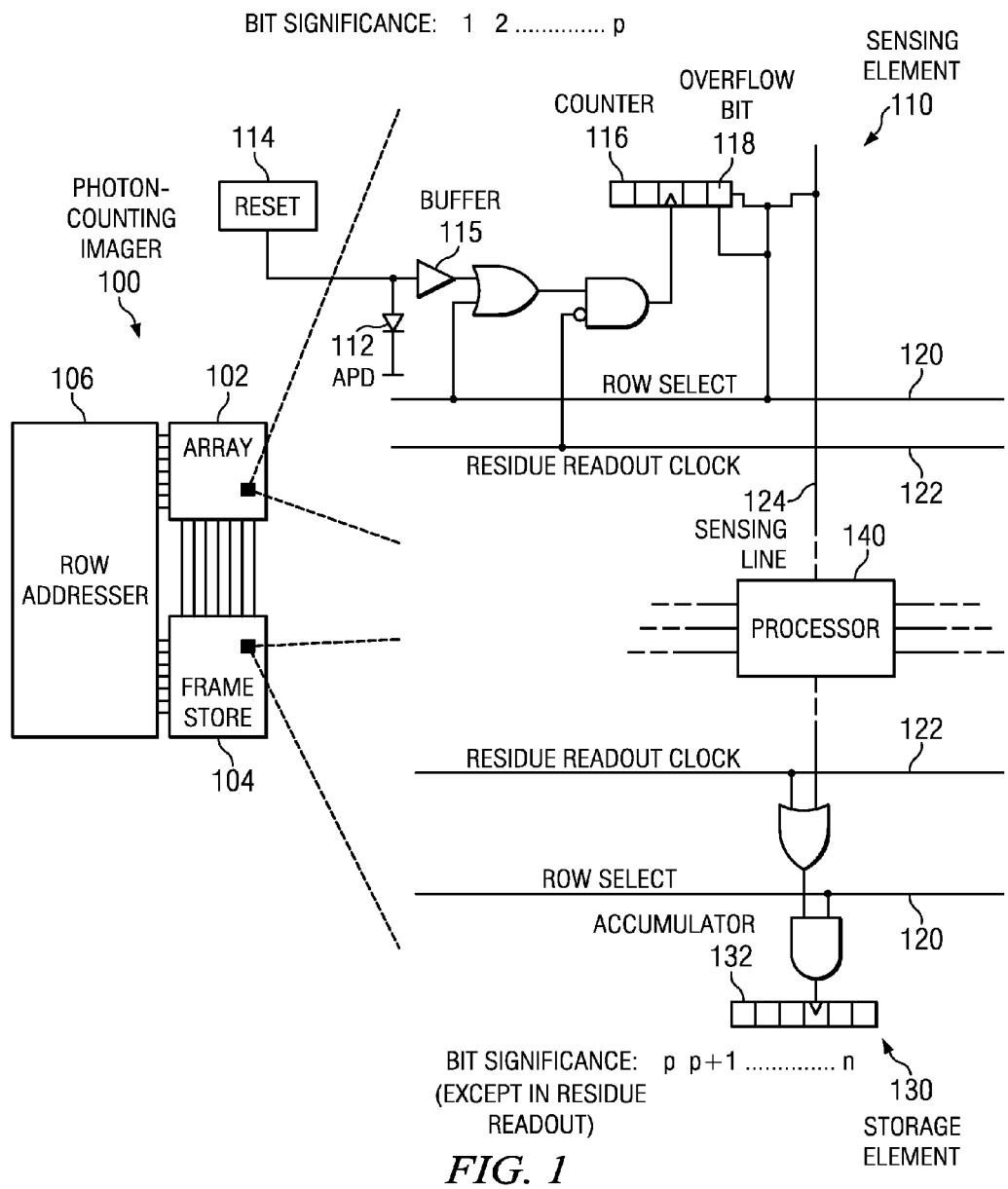
FIG. 1 is a block diagram of a photon-counting imager that shows the architecture of an individual sensing element, including a counter and an overflow bit in the sensing element according to embodiments of the present invention.

FIG. 1 shows a photon-counting imager 100 with sensing elements 110 that include overflow bits 118 to support serial readout. The imager 100 includes a two-dimensional array 102 of sensing elements 110, one of which is shown at right. Typically, the array 102 is arranged or disposed at the focal plane of a lens or imaging system (not shown), although the array 102 may also be used without a lens or imaging system for lensless imaging. A frame store 104 coupled to the columns of the array 102 includes one storage element 130 for every sensing element 110 in the array 102. A row addresser 106 coupled to the rows in the array 102 and the frame store 104 controls the transfer of data from the sensing elements 110 to their respective storage elements 130, as described in further detail below. Those skilled in the art will appreciate that other imager architectures fall within the scope of the present invention as well.

Each sensing element 110 includes a Geiger-mode avalanche photodiode (APD) 112 coupled via buffer 115 to a p-bit binary counter 116 whose most significant bit is the overflow bit 118. (Some sensing elements may use other digital counters, such as ripple counters or pseudorandom counters, instead of binary counters.) Incident photons trigger signals (pulses) from the APD 112 that cause the counter 116 to increment. The overflow bit 118 is set high after the sensing element detects and counts $2^{(p-1)}$ photons. A quench/reset circuit 114 in the sensing element 110 recharges the APD 112 after the detection of each photon.

The imager 100 transfers data from the overflow bits 118 during a microframe transfer operation initiated by a polling signal from a rolling readout system (not shown). A row select line 120 couples the polling signal to the overflow bit 118 during the micro frame transfer operation. If the overflow bit 118 is high when it receives the polling signal, it transfers data to an accumulator 132 in the corresponding storage element 130 via a sensing line 124. (If the overflow bit 118 is low, no data is transferred.) The frame-store accumulators 132 each have m=n−p+1 bits, where n is the total number bits associated with the sensing element 110 and p is the number of bits in the counter 116. Each time an accumulator 132 increments, it is actually registering $2^{(p-1)}$ photon detections that have occurred in the corresponding sensing element 110. Generally, each overflow bit 118 should be polled frequently enough to prevent the corresponding counter 116 from overflowing. For the imager 100 shown in FIG. 1, polling occurs at least once every $2^{(p-1)}\tau$ seconds, where $\tau$ is the mean time between successive photon arrivals at a given sensing element 110.

The microframes captured by the microframe transfer operations can be aggregated into a single frame that represents data collected during a relatively long integration period. After all the micro frame transfers in one frame are complete, the accumulators 132 are read out. At this point, the counters 116 in each sensing element 110 contain unread data. This "residue" can be read out in various ways, depending on the specific pixel architecture. If the counter in the pixel is a binary ripple counter that, for compactness, lacks multiplexors that enable the data to be shifted out, the residue can be read out by the technique illustrated in FIG. 1. Residue readout is done by incrementing the counters 116 with a residue readout clock coupled to the counters 116 via a residue readout line 122 and by sensing the rise of the most significant bit of the counters 116 (i.e., the overflow bit 118). If the most significant bit rises after s clock cycles, the residue value is inferred to be $2^{(p-1)}-s$. One way of extracting this information is to use the accumulator 132 to count these readout clock pulses. The residues are then read out from the accumulators 132, the counters 116 are reset, and the imager 100 is ready for the next frame. Alternatively, if the residue is smaller than a threshold value, such as the noise floor, the counters 116 can be reset without being read out before the next frame.

If the counter is a pseudorandom counter, residue readout is more straightforward, as a pseudorandom counter is just a shift register with logical feedback. In this case the feedback is disabled by a control signal and the residue data is clocked out serially using the same data path as the overflow bits.

CMOS readout architectures with counters 116 and overflow bits 118 in each sensing element 110 have a number of advantages compared to prior art architectures. Using an overflow bit effectively splits storage of the photon count between the counter in each sensing element 110 and the corresponding accumulator 132, facilitating compact layouts for both the sensing elements 110 and the storage elements 130 in the frame store 104. As a result, the sensing elements 110 can be smaller, enabling imaging with higher spatial resolution.

In addition, transferring an overflow bit 118, instead of a bit representing the detection of a single photon, significantly reduces the transfer bandwidth. For a 5-bit counter in a 256× 256 array with a time $\tau$=1 µs between transfers from a particular row, the transfer bandwidth is roughly 4 Gb/s. This is more than sixteen times lower than the 65 Gb/s transfer bandwidth required by a similar array with a single bit in each sensing element. Thus, splitting the total number of bits for each sensing element 110 across the sensing element 110 and the frame store 104 bits reduces the transfer bandwidth while maintaining the imager's dynamic range.

The imager 100 shown in FIG. 1 also includes processors 140 coupled along the column lines 124 that connect the counter 116 in the sensing element 110 to the accumulator 132 in the frame store 132. The processors 140 are also coupled to each other so that they can share and transfer data and instructions for on-chip jitter compensation, local dynamic range adjustment, signal/target identification, and other processing operations that take advantage of the microframe transfer operations. For example, the processors 140 can be used to compensate for jitter or blur induced by movement of the imager 100. Suppose that the imager 100 captures a first image, transfers the overflow bits to the frame store 104, then captures a second image that is shifted to the right by one pixel with respect to the first image due to jitter. This shift can be compensated on-chip by using the processors 140 to direct data from the sensing elements 110 to their neighboring elements' accumulators 132. In other words, if movement shifts the image recorded by the array 102 to the left, the processors 140 shift the image data to the right before the image data is stored in the frame store 104.

Similarly, processors 140 can be used to monitor captured images for specific targets, such as objects that blink or vibrate at specified frequencies. This is particularly useful in free-space optical communications during transmitter acquisition, when the entire array 102 may be used to search for a small transmitter, such as a laser on a satellite, over a large field of view. If the transmitter is operating at a specific modulation frequency, the processors 140 can be programmed to filter the micro frame data for that modulation frequency. Detection of the desired modulation frequency indicates successful acquisition of the transmitter, which may cause the imager 100 to switch from an acquisition mode to a communication mode. In communication mode, other processors 140 may stop querying their sensing elements, reducing the amount of collected data (and the transfer time/bandwidth).

Unlike systems that rely on adaptive integration times to prevent pixel counter overflow, systems according to embodiments of the present invention always support shot-noise-limited detection but do not require complicated pixel logic circuitry. At higher photon fluxes, an adaptive system reduces the integration period to less than the available stare interval (i.e., the photon detection window). As a result, the adaptive system detects proportionately fewer photons given a constant photon flux. Because the shot noise is proportional to the square root of the number of detected photons, however, the shot noise power falls as the number of detected photons goes down. If noise from other sources, such as thermal noise, remains relatively constant, then the shot noise power will fall the below the thermal noise power if the number of detected photons goes down too much. Conversely, systems with overflow bits can detect photons during the entire stare time without suffering overflow, so they do not have to operate with reduced integration times (and, therefore, support shot-noise-limited operation).

For example, suppose that an adaptive system collects an average of 100 photons per second during a 10-nanosecond stare interval; at this flux, the shot noise is equivalent to 30 photons. If the adaptive system overflows after counting 100 photons, it will overflow about half the time. Reducing the detection period to one second effectively eliminates the possibility of overflow by reducing the number of detected photons to about 100. It also reduces the shot noise to about to 10 photons. If thermal noise is equivalent to 20 photons, however, then reducing the integration interval to one nanosecond causes the adaptive system to operate in the thermal noise limit rather than the shot noise limit. In contrast, overflow (and loss of information) can be avoided and shot-noise-limited operation can be preserved by using an overflow bit instead of reducing the integration time.

Other CMOS Readout Architectures

Compared to other CMOS architectures, CMOS readout architectures with overflow bits according to embodiments of the present invention are simpler to make and to operate. For example, U.S. patent application Ser. No. 10/836,896, filed on Apr. 30, 2004, by Stern et al. and incorporated herein by reference in its entirety, describes another CMOS architecture designed to support a very small pixel. During the stare time, any APD in the Stern architecture that detects a photon produces a digital signal that is registered and stored as a single bit by a circuit within the sensing element. This stare time is made sufficiently short so that the arrival of more than one photon is very unlikely. At the end of the stare time the information in the sensing elements is transferred to a set of n-bit counters placed adjacent to the array; this set of counters is termed the frame-store accumulators. Each sensing element whose detection bit is set causes the corresponding accumulator to be incremented, and the detection bit is then cleared. Longer integration times are achieved by repeating this stare-and-transfer cycle, summing as many as $2^n-1$ micro frames to obtain a frame of n-bit intensity data.

The one-bit sensing element in the Stern architecture can be made very small, and the dynamic range of small-format imagers, as limited by counter overflow, is set by the length of an accumulator that does not consume sensing element real estate. The dynamic range is also limited by the transfer rate. For small (e.g., 32×32) formats, the duration of the transfer operation (tens of nanoseconds) is commensurate with the time needed to adequately quench (reset) a silicon APD after detection of each photon, so the APDs can be reset with a global rearm signal once the transfer is complete, obviating per-element reset circuitry. As the format of the array is scaled up, however, microframe transfer times become longer and eventually exceed APD quench times. In this case, the excess dead time incurred by using a global reset reduces the duty cycle of photon collection and thereby exacts a penalty in effective dynamic range.

Reintroducing per-pixel quenching and reset circuitry and performing microframe transfers continuously, one row at a time, enables increased duty cycle and dynamic range, but increases the transfer bandwidth and the size of the sensing elements in the Stern architecture. In particular, the continuous microframe transfers require high micro frame transfer bandwidth because the transfer time must be shorter than the mean time between photon arrivals at any pixel. For example, an N×N array with a time τ between transfers from a particular row has an aggregate transfer rate of $N^2/\tau$ bits/s (e.g., for N=256 and τ=1 μs, the transfer rate is over 65 Gb/s).

Another CMOS architecture involves adding several counter bits to the circuit in each sensing element to create a multiple-counter architecture that operates with reduced transfer bandwidth. With p bits in the sensing element, the revisit time could be lengthened to $(2^p-1)\tau$. The frame transfer operation involves addition of the p-bit value to the corresponding n-bit accumulator. The reason is that the sensing element holds only the least significant bits, whereas the accumulators in the frame store are full-length counters. This represents a compromise between the bandwidth reduction afforded by a full-length counter in the pixel and the area reduction afforded by a one-bit pixel.

When implementation details are considered, multiple-counter architectures are not as attractive as one would hope in terms of sensing element size reduction. One candidate sensing-element multiple-counter architecture is a pseudo-random counter, which is very compact because it is a simple shift register with feedback. Another candidate is a conventional binary counter. If microframe transfer is done serially, extra multiplexors must be included in the sensing element. Parallel transfer requires multiple lines and line drivers. The APD quenching and reset circuitry might also require significant real estate. The time needed to quench the APD is long compared to a CMOS gate delay; a method is needed for timed quenching without large capacitors, long resistors, or complex timing circuitry in the pixels.

Alternative Counter/Overflow Bit Architectures

Figure 2A:
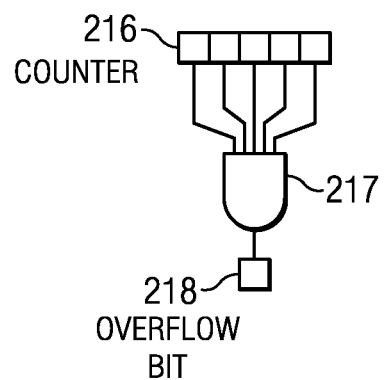
FIG. 2A is a block diagram of an overflow bit generated by logic coupled to a counter according to alternative embodiments of the present invention.
Figure 2B:
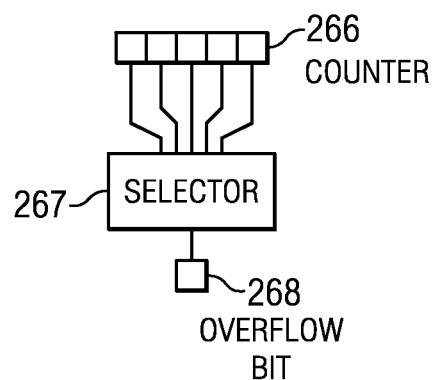
FIG. 2B is a block diagram of an overflow bit selected by a selector coupled to another counter according to alternative embodiments of the present invention.

FIGS. 2A and 2B show alternative arrangements of counters and overflow bits suitable for use in photon-counting sensing elements. FIG. 2A shows a p-bit counter 216 coupled to an overflow bit 218 via an AND gate 217 coupled to each bit in the counter 216. As before, the counter 218 increments in response to the detection of individual photons by an APD (not shown). Upon detection of photon number $2^p-1$, all the bits in the counter 216 go high, causing the AND gate 217 to set the overflow bit 218. Different combinations and arrangements of logic gates can be used instead of the AND gate 217 to set the overflow bit in a sensing element. For example, logic coupled to the counter can be used to set an overflow bit when the counter reaches a certain count or pattern.

As shown in FIG. 2B, an overflow bit 268 can also be chosen from among bits in a counter 266 with a selector 267. The selector 267 may be used to change the bit in the counter 266 used to set the overflow bit 268, changing the effective dynamic range of the associated sensing element. Changing the overflow bit 268 can be used when light levels fluctuate rapidly to avoid operating in saturated or photon-starved states. It can also be used to vary the effective dynamic range of individual sensing elements as a function of array position or incident light level. For example, overflow bits in sensing elements at or near saturation can be set to correspond to more or most significant bits, whereas overflow bits in photon-starved sensing elements can be set to correspond to lower or least significant bits. Scaling raw data collected from the imager according to the respective bit selections optimizes dynamic range in each element.

Overflow bits also provide information about photon flux, which, on average, is equal to the number of photons needed to set the overflow bit divided by the time since the overflow bit was last set. Varying the number of photons required to trigger the overflow bit makes it possible to change the precision of the measurement; lower overflow thresholds may provide finer resolution. Similarly, polling the overflow bit more or less often also affects the resolution with which the photon flux is measured. Measuring when the overflow bit also provides information about when a group of photons arrived at the detector.

APD Quenching and Resetting

Figure 3:
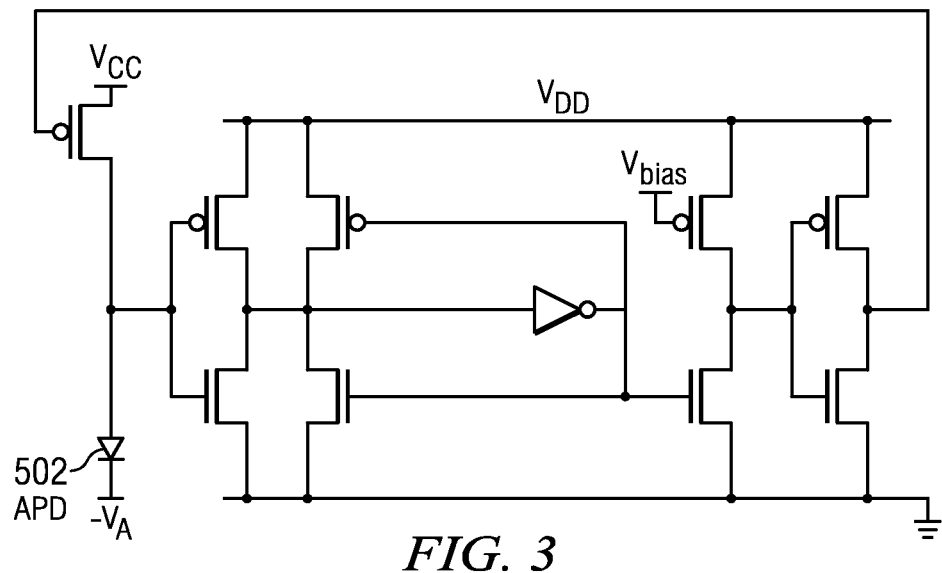
FIG. 3 is a block diagram of an avalanche photodiode (APD) reset circuit (quenching circuit not shown).

FIG. 3 shows a compact APD reset circuit 500 used to quench and recharge an APD 502 after detection of a photon. The APD 502 is sensed by a Schmitt trigger cascaded with an inverter pair that has a current-starved pull-up in the first inverter. Simulations indicate that the reset circuit 500 produces significant delay both on the falling (detect) and rising (reset) edge of the APD signal, giving the APD 502 adequate time to quench while also producing a long enough rearm pulse to completely recharge the APD 502. The feedback loop in this circuit includes ten transistors, commensurate with the complexity of a single flip-flop.

Rolling Readout Systems, Overflow Bit Polling, and Data Transfer

Figure 4:
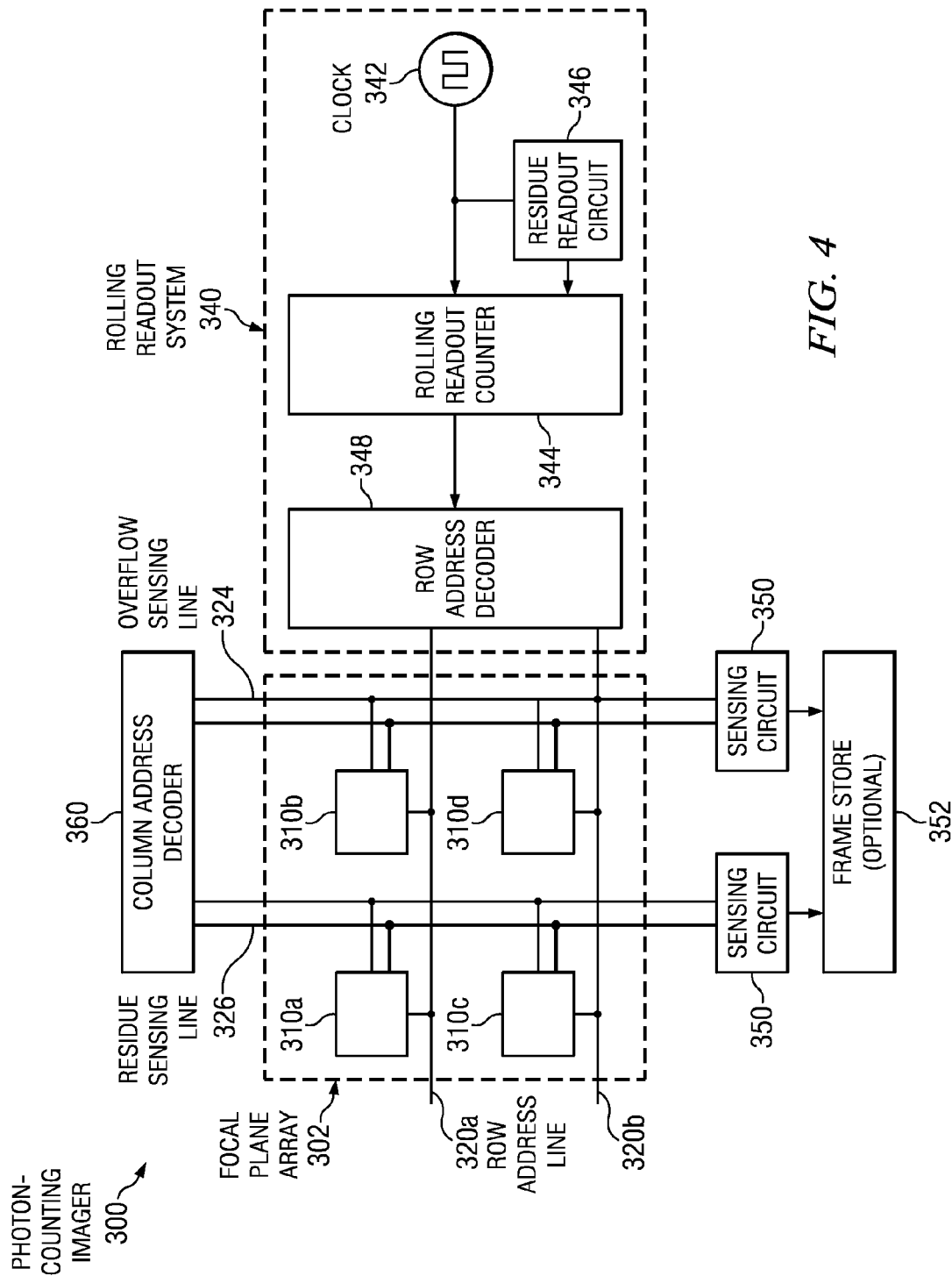
FIG. 4 is a block diagram of a photon-counting imager with a rolling readout system according to embodiments of the present invention.

FIG. 4 shows the CMOS readout architecture for a photon-counting imager 300 with sensing elements 310a-310d (collectively, sensing elements 310) in a focal plane array 302. (Only four elements 310 are shown for simplicity.) As above, each sensing element 310 includes a photon-counting detector, such as a Geiger-mode APD, that detects incident photons, a three-bit counter that increments in response to each detection, and an overflow bit that is set upon detection of a given number of photons. The APDs may be biased globally to a resting voltage, then armed and disarmed autonomously using local circuits to push the bias above the threshold for Geiger-mode operation. The APDs may also be biased globally above the Geiger-mode threshold.

Figure 5:
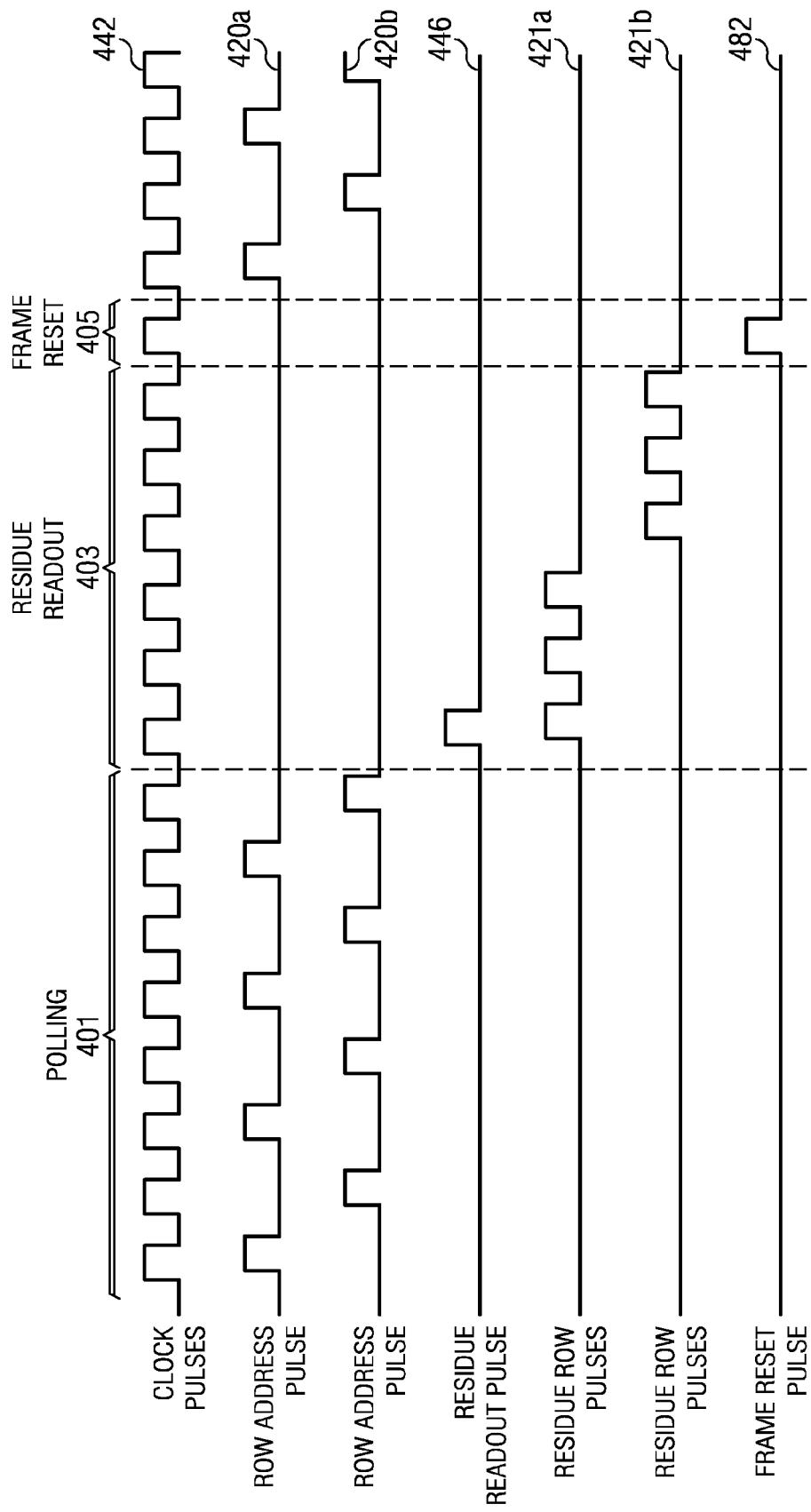
FIG. 5 is a timing diagram showing example overflow bit and counter residue polling periods according to embodiments of the present invention.

A rolling readout system 340, which includes a clock 342, a rolling readout counter 344, and a residue readout circuit 344, polls the overflow bits and the counters in the sensing elements 310 according to the timing diagram shown in FIG. 5. The rolling readout counter 344 counts pulses 442 from a clock 342 to determine when to poll the overflow bits during a microframe overflow polling interval 401. Here, the rolling readout system 340 polls one row of the array 302 every time the clock 342 ticks with row address pulses 420a and 420b transmitted from a row address decoder 348 to the sensing elements 310 via row address lines 320a and 320b. The rows are polled sequentially; once the last row is polled, polling starts again with at the first row.

When the sensing elements 310 receive the polling signal, they transfer their respective overflow bits to sensing circuits 350 via overflow sensing lines 324 arranged along columns of the array 302. (If the overflow bit is low, no data is transferred.) The sensing circuits 350 may transfer the accumulated overflow to an optional frame store 352, an external memory, or an external processor. As described above, each polling of and transfer of data from the overflow bits is a microframe operation that occurs many times during the accumulation of a single frame of data.

When the imager 300 reaches the end of a frame, the residue readout circuit 346 emits a pulse 446 or other signal that triggers interrogation of the counters in the sensing elements 310 during a residue readout interval 403. The row address decoder 348 responds to the pulse 446 from the residue readout circuit 346 by transmitting residue readout pulses 421a and 421b to the sensing elements 310 via the row address lines 320a and 320b, respectively. FIG. 5 shows three residue readout pulses 421a and 412b per row, where each pulse corresponds to one bit in the three-bit counter in each sensing element 310. (In general, counters may include more than three bits, and the number of residue readout pulses may match the number of bits per counter.) Upon receiving a residue readout pulse 412a/412b, each addressed sensing element 310 transfers one bit from its counter to a corresponding sensing circuit 350 via a residue sensing line 326 arranged along a column of the array 302.

Alternatively, the sensing element 310 may transfer both overflow bits and counter data to the sensing circuits 350 via common sensing lines (not shown). The frame store 352 accumulates the residue from the counters, which can be used to enhance the dynamic range of the image acquired by the imager 300. Once the data transfer ends, the frame store 352 is reset during a frame reset interval 405 with a frame reset pulse 482. Reset may occur as consequence of readout, e.g., because readout involves shifting data out of a shift register. Separate reset pulses may also trigger reset.

Typically, polling occurs periodically with a frequency determined by the significance of the overflow bit and the expected or actual photon flux; for example, an overflow bit representing detection of 2047 photons may be polled less often than an overflow bit representing detection of 511 photons. In some rolling readout systems, the polling period can be changed dynamically in response to selection of a different overflow bit from the counter or changes in the photon flux. Residue readout occurs less frequently than polling of the overflow bit (e.g., once per frame). The rolling readout system can also poll the overflow bits and the counters aperiodically or on demand, if desired.

Photon Counting and Detection Procedures

Figure 6:
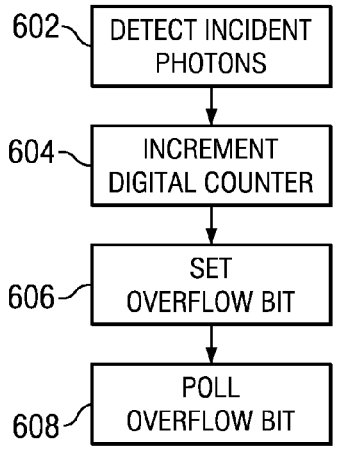
FIG. 6 is a flow diagram illustrating photon detection and counting according to embodiments of the present invention.

FIG. 6 is a flow diagram that shows basic photon counting and detection 600 using photon-counting imagers with CMOS readout architectures, such as the photon-counting imagers shown in FIGS. 1 and 3. First, incident photons are detected (602) with a photon-counting detector, such as a Geiger-mode APD. Every photon detection causes a counter to increment (604); once the counter indicates a given number of photons has been detected, an overflow bit is set (606). The overflow bit is polled (608) to give an indication of whether or not the number of detected photons exceeds the given number.

Figure 7:
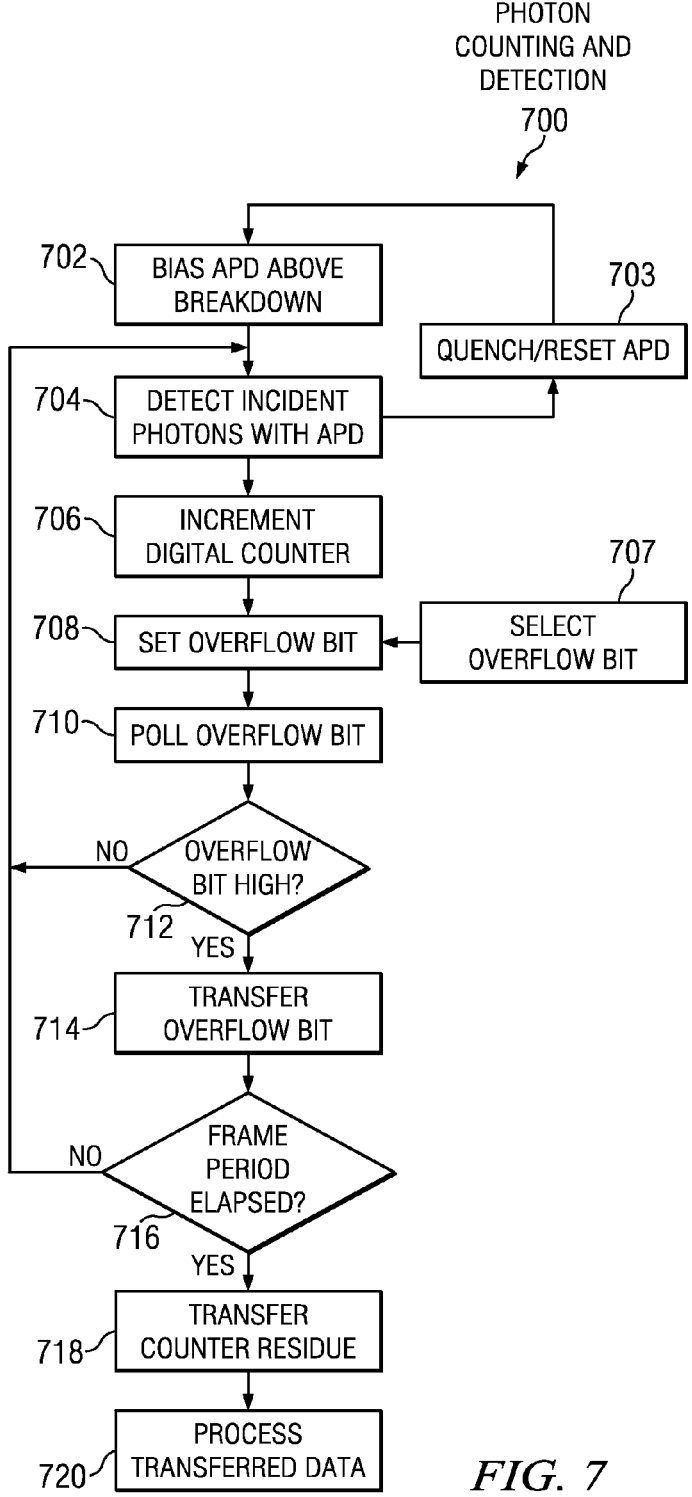
FIG. 7 is a flow diagram illustrating alternative photon detection and counting according to an embodiment of the present invention.

FIG. 7 is a flow diagram that illustrates photon counting and detection 700 using Geiger-mode APD arrays and CMOS readout architectures. Each APD in the array is biased above its breakdown voltage (702) so that it operates in Geiger mode. When an APD in a given sensing element detects a photon (704), it emits a pulse that causes a digital counter in the sensing element to increment (706). After each detection, the APD is quenched and recharged (703) before being biased (702) prior to arrival of the next photon.

As the digital counter increments (706) in response to successive photon detections, it may eventually reach a preset or predetermined count, causing the sensing element to set an internal overflow bit (708). As discussed above, the overflow bit can be selected from among the bits in the counter (707), its value can be determined based on the count stored in the counter, or it can be a static value, e.g., the most-significant bit in the counter. The overflow bit is polled (710), and, if it is high (712), the bit is transferred (714) to a frame store, processor, or any other suitable storage or processing device, then reset. If the overflow bit is low (712), no data transfer or resetting is necessary.

Photon detection, counter incrementing, and polling continue until a frame integration period elapses (716). At this point, the data stored in the digital counter, or residue, is transferred (718) to a frame store. The transferred overflow bits and the transferred residue are then processed (720) to create an image or other display indicating detections that occurred during the frame integration period.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for detecting and counting photons, comprising:
    sensing elements, each sensing element including:
        a photon-counting detector to provide signals representative of detected photons;
        a digital counter operably coupled to the photon-counting detector and configured to change a count responsive to the signals from the photon-counting detector and to continue changing the count after the number of detected photons has exceeded a certain number;
        an overflow bit operably coupled to the digital counter and responsive to an indication that the count in the digital counter has reached the certain number; and
    a rolling readout system operably coupled to each sensing element and configured to poll the overflow bit.

2. An apparatus as in claim 1, wherein the photon-counting detector is a Geiger-mode avalanche photodiode.

3. An apparatus as in claim 2, wherein each sensing element includes a reset circuit configured to charge the Geiger-mode avalanche photodiode between arrival of successive photons.

4. An apparatus as in claim 1, wherein the digital counter includes at least one of a binary counter, a ripple counter, and a pseudorandom counter.

5. An apparatus as in claim 1, wherein the apparatus transfers data from the overflow bit if the overflow bit is high when polled.

6. An apparatus as in claim 1, wherein the apparatus does not transfer data from the overflow bit if the overflow bit is low when polled.

7. An apparatus as in claim 1, wherein the overflow bit is a bit in the digital counter.

8. An apparatus as in claim 7, further including:
    a selector operably coupled to the digital counter and configured to select the overflow bit from among bits in the digital counter.

9. An apparatus as in claim 1, further including:
    logic coupled to the digital counter and the overflow bit, the logic configured to set the overflow bit based on a count stored in the digital counter.

10. An apparatus as in claim 1, wherein the overflow bit is configured to be polled periodically at a polling period.

11. An apparatus as in claim 10, wherein the polling period is longer than a time between detection of successive photons.

12. An apparatus as claim 10, further including:
    a residue readout system operably coupled to the digital counter and configured to read out the entire digital counter periodically at an interrogation period longer than the polling period.

13. An apparatus as in claim 1, wherein the rolling readout system is configured to control when the overflow bit is polled.

14. An apparatus as in claim 1, further including:
    a sensing line operably coupled to at least one sensing element and configured to transfer data from the sensing element.

15. An apparatus as in claim 1, further including:
    a frame-store accumulator operably coupled to the overflow bit and configured to store data from the overflow bit.

16. A detector array as in claim 1 in combination with an imaging system.

17. An apparatus for detecting and counting photons, comprising:
    sensing elements, each sensing element including:
        a photon-counting detector;
        a digital counter operably coupled to the photon-counting detector and responsive to signals from the photon-counting detector;
        an overflow bit operably coupled to the digital counter and responsive to the digital counter; and
    a rolling readout system operably coupled to each sensing element and configured to poll the overflow bit,
    wherein the overflow bit is a most-significant bit in the digital counter.

18. An apparatus for detecting and counting photons, comprising:
    sensing elements, each sensing element including:
        a photon-counting detector;
        a digital counter operably coupled to the photon-counting detector and responsive to signals from the photon-counting detector;
        an overflow bit operably coupled to the digital counter and responsive to the digital counter;

a rolling readout system operably coupled to each sensing element and configured to poll the overflow bit; and an external processor or external memory operably coupled to the overflow bit and configured to store or process data from the overflow bit.

19. A method of detecting and counting photons, comprising:

detecting photons at a particular sensing element in an array of sensing elements;

incrementing a count in a digital counter in the particular sensing element in response to detection of each photon by the sensing element;

setting an overflow bit in the particular sensing element responsive to the digital counter's indicating that a certain number of photons has been counted;

changing the count in the digital counter, after setting the overflow bit, in response to detection of additional photons by the sensing element; and polling the overflow bit to yield an indication that the certain number of photons has been counted.

20. A method as in claim 19, wherein detecting photons includes detecting photons with a Geiger-mode avalanche photodiode.

21. A method as in claim 20, further including:

resetting the Geiger-mode avalanche photodiode after detection of a photon.

22. A method as in claim 19, wherein the digital counter includes at least one of a binary counter, a ripple counter, and a pseudorandom counter.

23. A method as in claim 19, further including:

transferring data from the overflow bit if the overflow bit is high when polled.

24. A method as in claim 19, wherein the overflow bit is a bit in the digital counter.

25. A method as in claim 19, further including:

selecting the overflow bit from among bits in the digital counter.

26. A method as in claim 25, wherein setting the overflow bit includes incrementing the overflow bit based on data stored in the digital counter.

27. A method as in claim 19, wherein polling the overflow bit occurs periodically at a polling period.

28. A method as in claim 19, wherein polling the overflow bit occurs less frequently than detecting photons.

29. A method as in claim 19, further including:
controlling when the overflow bit is polled.

30. A method as in claim 19, further including:
transferring data from the overflow bit to a frame-store accumulator.

31. A method as in claim 19, further including:
forming an image based on indications of the number of detected photons from at least one of the digital counters and the overflow bits.

32. A method of detecting and counting photons, comprising:

detecting photons at a particular sensing element in an array of sensing elements;

incrementing a digital counter in the particular sensing element in response to detection of each photon by the sensing element;

setting an overflow bit in the particular sensing element responsive to the digital counter's indicating that a certain number of photons has been counted; and polling the overflow bit to yield an indication that the certain number of photons has been counted, wherein the overflow bit is a most-significant bit in the digital counter.

33. A method of detecting and counting photons, comprising:

detecting photons at a particular sensing element in an array of sensing elements;

incrementing a digital counter in the particular sensing element in response to detection of each photon by the sensing element;

setting an overflow bit in the particular sensing element responsive to the digital counter's indicating that a certain number of photons has been counted;

polling the overflow bit to yield an indication that the certain number of photons has been counted; and interrogating the digital counter less frequently than the polling of the overflow bit.

34. A method of detecting and counting photons, comprising:

detecting photons at a particular sensing element in an array of sensing elements;

incrementing a digital counter in the particular sensing element in response to detection of each photon by the sensing element;

setting an overflow bit in the particular sensing element responsive to the digital counter's indicating that a certain number of photons has been counted;

polling the overflow bit to yield an indication that the certain number of photons has been counted;

transferring data from the overflow bit to an off-chip processor or off-chip memory; and processing the overflow bit with the off-chip processor or storing the overflow bit with the off-chip memory.

35. A sensing element, comprising:

a photon-counting detector to provide signals representative of detected photons;

a digital counter operably coupled to the photon-counting detector and configured to change a count responsive to the signals from the photon-counting detector and to continue changing the count after the number of detected photons has exceeded a certain number; and an overflow bit operably coupled to the digital counter and responsive to an indication that the count in the digital counter has reached the certain number.

* * * * *